US011427250B2

(12) United States Patent
Chae (10) Patent No.: US 11,427,250 B2
(45) Date of Patent: Aug. 30, 2022

(54) ROTARY SENSOR ASSEMBLY AND REAR WHEEL STEERING SYSTEM INCLUDING THE SAME

(71) Applicant: MANDO CORPORATION, Gyeonggi-do (KR)

(72) Inventor: Han Sang Chae, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 810 days.

(21) Appl. No.: 16/278,036

(22) Filed: Feb. 15, 2019

(65) Prior Publication Data
US 2019/0256142 A1    Aug. 22, 2019

(30) Foreign Application Priority Data

Feb. 22, 2018  (KR) .................. 10-2018-0021223

(51) Int. Cl.
| | | |
|---|---|---|
| *B62D 15/02* | (2006.01) | |
| *B60G 17/019* | (2006.01) | |
| *B62D 7/14* | (2006.01) | |
| *G01B 7/14* | (2006.01) | |

(Continued)

(52) U.S. Cl.
CPC ....... *B62D 15/0225* (2013.01); *B60G 17/019* (2013.01); *B62D 3/02* (2013.01); *B62D 7/146* (2013.01); *G01B 7/14* (2013.01); *G01D 5/145* (2013.01); *B60G 2202/422* (2013.01); *B60G 2204/11* (2013.01)

(58) Field of Classification Search
CPC ............ B60G 17/019; B60G 2202/422; B60G 2204/11; B62D 17/00; B62D 7/146; B62D 15/0225; B62D 3/02

USPC ............................................. 180/400
See application file for complete search history.

(56) References Cited

U.S. PATENT DOCUMENTS 9,254,868 B2 *  2/2016  Ando ................. B62D 7/146
9,758,190 B2 *  9/2017  Ohba ................. B62D 7/09
(Continued)

FOREIGN PATENT DOCUMENTS

| EP | 2 816 321 | 12/2014 |
|---|---|---|
| EP | 2 950 051 | 12/2015 |

(Continued)

OTHER PUBLICATIONS

Extended European Search Report dated Jul. 10, 2019 for European Application No. 19157728.7.

*Primary Examiner* — Paul N Dickson
*Assistant Examiner* — Caitlin Anne Miller
(74) *Attorney, Agent, or Firm* — Ladas & Parry, LLP (57) ABSTRACT

The present invention relates to a rotary sensor assembly and a rear wheel steering system including the same. According to one embodiment of the present invention, a rotary sensor assembly includes: a rotary sensor subassembly configured to sense a stroke of a driving shaft configured to receive rotating power to move linearly; a sensing guide configured to be moved by receiving a moving force when the driving shaft moves such that the rotary sensor subassembly senses movement of the driving shaft; and fasteners which couple the sensing guide to the driving shaft, wherein the rotary sensor subassembly senses movement of the sensing guide to sense the stroke of the driving shaft when the driving shaft moves.

17 Claims, 5 Drawing Sheets

(51) Int. Cl.
  *B62D 3/02* (2006.01)
  *G01D 5/14* (2006.01)

(56) References Cited

U.S. PATENT DOCUMENTS

2016/0167698 A1\* 6/2016 Ooba .................. B60K 7/0007
                                                    180/65.51
2017/0151981 A1\* 6/2017 Suzuki ................ B62D 7/1509

FOREIGN PATENT DOCUMENTS

EP         3 147 181        3/2017
KR    10-2004-0097632      11/2004

\* cited by examiner

ROTARY SENSOR ASSEMBLY AND REAR WHEEL STEERING SYSTEM INCLUDING THE SAME

CROSS-REFERENCE TO RELATED APPLICATION

This application claims priority to and the benefit of Korean Patent Application No. 10-2018-0021223, filed on Feb. 22, 2018, the disclosure of which is incorporated herein by reference in its entirety.

BACKGROUND

1. Field of the Invention

The present invention relates to a rotary sensor assembly and a rear wheel steering system including the same.

2. Discussion of Related Art

Generally, a rear wheel steering system of a vehicle includes a hydraulic system, a motor, and a speed reducer which are installed therein and serves to steer rear wheels of the vehicle according to a traveling situation of the vehicle. The rear wheel steering system generally operates for the purpose of reducing a rotating radius when the vehicle travels at a low speed and improving traveling stability when the vehicle travels at a high speed.

Generally, a lead screw bar of the rear wheel steering system of the vehicle may move forward or backward according to a forward or reverse rotation of the motor. Movement of the lead screw bar is measured by a sensor configured to detect movement of a magnet. The sensor may measure a displacement of a linearly reciprocating object to stably control the vehicle. A noncontact type position sensor may be used as the sensor.

However, the measurement of the sensor has the following problems. When a linear sensor is used, there is a limitation of a stroke due to characteristics of the sensor. When the stroke exceeds a stroke range secured by the sensor, there is a problem in that sensing is not possible. In addition, in a case in which a structure surrounding the magnet is needed, when a force is applied to the structure while the structure is driven, abrasion may occur due to friction so that a gap may be formed.

Meanwhile, in a case in which a rotary sensor is used, a separate structure for preventing rotation is needed at an outer side other than a side at which the sensor is positioned. In order to form the structure, a serration assembly of a driving shaft and a housing surrounding the driving shaft is generally used. However, in the case in which the serration assembly is used, there are problems in that clearance control and processing are difficult and manufacturing cost increases.

SUMMARY OF THE INVENTION

The present invention is directed to providing a rotary sensor assembly having a new structure capable of being applied to a rear wheel steering system and a rear wheel steering system including the same.

The present invention is not limited thereto, and other objectives which are not described above will be clearly understood by those skilled in the art through below descriptions.

The present invention provides a rotary sensor assembly.

According to an aspect of the present invention, there is provided a rotary sensor assembly comprising a rotary sensor subassembly configured to sense a stroke of a driving shaft configured to move linearly in response to input of rotating power; a sensing guide configured to be moved by a force received from the driving shaft when the driving shaft moves such that the rotary sensor subassembly senses movement of the driving shaft; and fasteners which couple the sensing guide to the driving shaft, wherein the rotary sensor subassembly senses movement of the sensing guide to sense the stroke of the driving shaft when the driving shaft moves.

Here, the sensing guide may include: a rack and gear assembly having a toothed rack configured to move according to the movement of the driving shaft and a gear; and a rack holder coupled to the rack and gear assembly to support the rack and gear assembly.

The rotary sensor subassembly may include: a rotary sensor configured to sense the driving shaft; and a sensor-gear interconnect having one end which is in contact with the gear and configured to transmit movement of the gear to the rotary sensor, wherein the rotary sensor senses the movement of the gear when the driving shaft moves whereby the rotary sensor senses the stroke of the driving shaft.

The gear may be configured to be moved by engaging with gear teeth formed on at least a part of the toothed rack.

The sensing guide may further include a toothed rack coupler which couples the toothed rack and the rack holder.

A toothed rack coupler hole into which the toothed rack coupler is inserted nay be located in the toothed rack; and a rack holder coupler hole into which the toothed rack coupler is inserted may be formed in the rack holder.

The toothed rack coupler may include: a bush body; and bush protrusions formed at both ends of the bush body, having diameters which are greater than that of the bush body, and provided to have ring shapes.

A plurality of fastener holes to which the fasteners are coupled may be formed in the rack holder.

The sensing guide may further include an elastic part which presses the rack and gear assembly and the rack holder when the rack and gear assembly and the rack holder move with the driving shaft.

The sensor-gear interconnect may be located under the rotary sensor; and the sensor-gear interconnect may protrude toward the rack and gear assembly.

A pinion gear engaged and rotated with the toothed rack may be provided as the gear.

The sensor-gear interconnect may be coupled to or in contact with the gear to allow the rotary sensor to detect the stroke of the driving shaft.

The present invention provides a rear wheel steering system.

According to another aspect of the present invention, there is provided a rear wheel steering system including the rotary sensor assembly and a driving shaft assembly including a driving shaft connected to a rear wheel, driven by power received from a motor, and configured to change a tow angle of the rear wheel, and a housing inside which the driving shaft is positioned.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Embodiments of the present invention will be described in more detail with reference to the accompanying drawings. The embodiments of the present invention may be changed in many different forms and should not be construed as being limited to the following embodiments. The embodiments are provided to more completely explain the present invention to those skilled in the art. Therefore, there may be regions in which shapes are exaggeratedly illustrated to more clearly explain them in the drawings. Terms and words used in this specification and claims are not to be interpreted as limited to commonly used meanings or meanings in dictionaries and should be interpreted on the basis of the principle that the inventors have appropriately defined concepts of terms in order to describe the invention of the inventors in the best way.

A rear wheel steering system 1 is an apparatus installed in a vehicle and configured to change a tow angle of a rear wheel according to a control signal of a controller. The rear wheel steering system 1 may be disposed to extend in a width direction of the vehicle and connected to each of the rear wheels of the vehicle. The rear wheel steering system 1 may laterally move so as to change the tow angle of the rear wheel according to the control signal of the controller.

Figure 1:
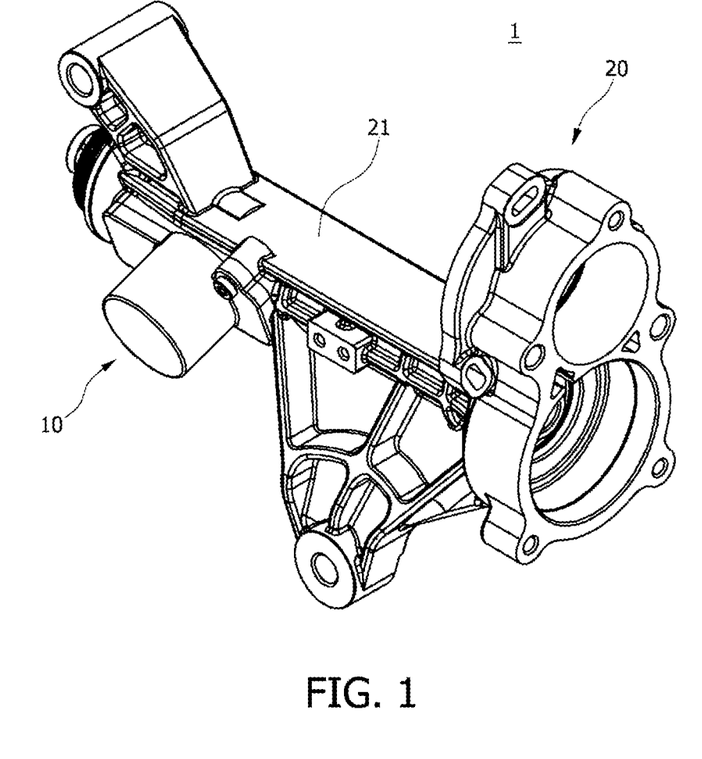
FIG. 1 is a perspective view illustrating a rear wheel steering system according to one embodiment of the present invention.

Referring to FIG. 1, the rear wheel steering system 1 may include a driving shaft assembly 20 and a rotary sensor assembly 10.

The driving shaft assembly 20 includes a housing 21 and a driving shaft 29.

The housing 21 may have a space therein. The driving shaft 29 may be positioned inside the housing 21.

The rotary sensor assembly 10, which will be described below, may be coupled to the housing 21.

Figure 2:
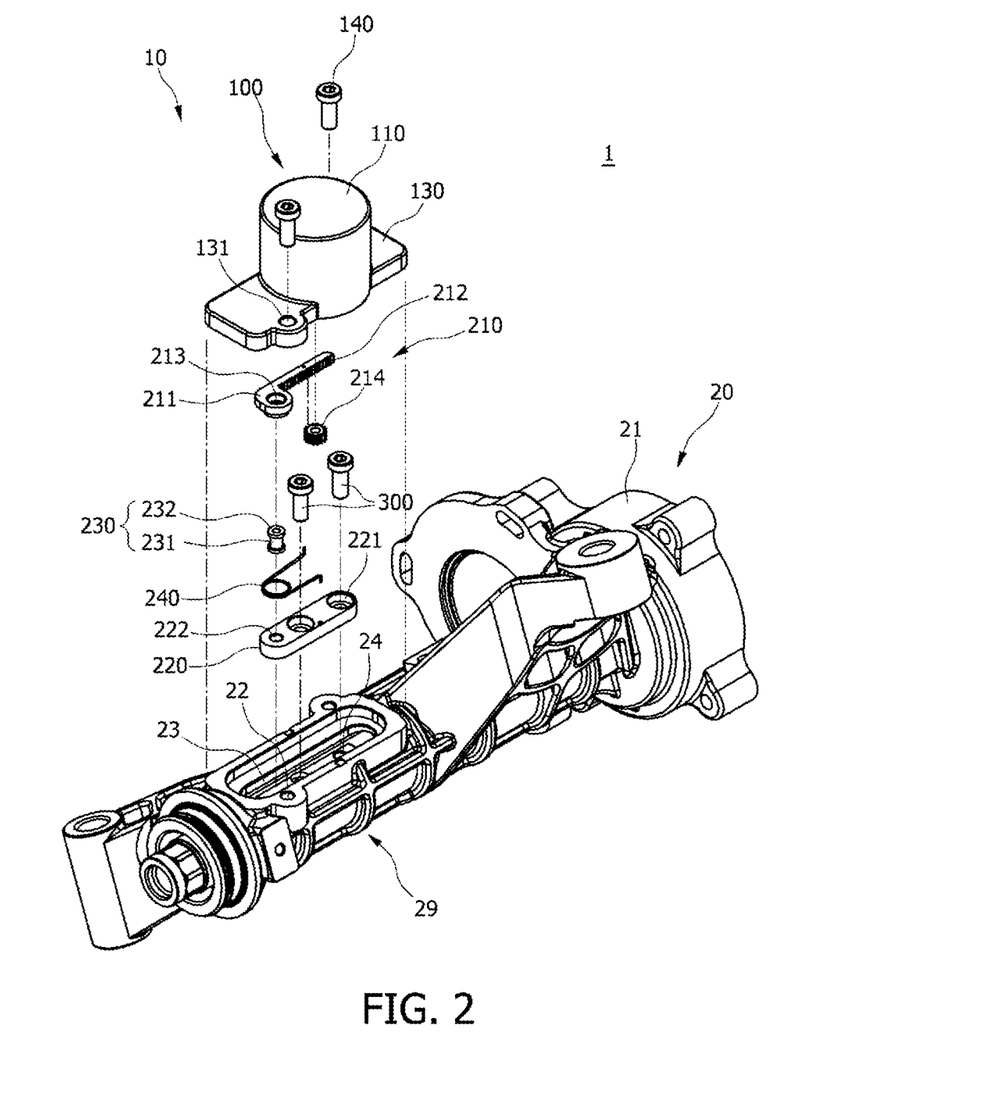
FIG. 2 is an exploded perspective view illustrating an exploded rotary sensor assembly coupled to the rear wheel steering system of FIG. 1.

A guide groove 23 may be formed in the housing 21 such that the rotary sensor assembly 10, which will be described below, is coupled to the housing 21 as illustrated in FIG. 2. A long groove may be formed as the guide groove 23 such that a rack holder 220 of a sensing guide 200 may be inserted into the guide groove 23 and laterally moved in a direction parallel to the driving shaft 29. The guide groove 23 is formed to pass through the housing 21 to communicate with an inside of the housing 21 so that the driving shaft 29 disposed inside the housing 21 is exposed. Meanwhile, fasteners holes 24 are formed in an outer circumferential surface of the exposed driving shaft 29 so as to be coupled to fasteners 300 which will be described below. In addition, sensor coupling grooves 22 to which sensor coupling parts 140 of a rotary sensor subassembly 100, which will be described below, may be coupled may be formed in the housing 21.

The driving shaft 29 may receive rotating power generated by a motor to move linearly. The driving shaft 29 may be positioned inside the housing 21. The driving shaft 29 may be driven by the power received from the motor and may change the tow angle of the rear wheel.

The fasteners holes 24 to which the fasteners 300 may be coupled may be formed in the driving shaft 29 as described above, and the driving shaft 29 may be coupled, by the fasteners 300, to the rack holder 220 of the sensing guide 200 to move with the rack holder 220 when moving linearly.

The rotary sensor assembly 10 may sense the driving shaft 29. As an example, the rotary sensor assembly 10 may sense a stroke of the driving shaft 29, that is, an extent of movement of the driving shaft 29. In addition, the rotary sensor assembly 10 may be coupled to the driving shaft 29 to prevent rotation of the driving shaft 29.

The rotary sensor assembly 10 includes the rotary sensor subassembly 100, the sensing guide 200, and the fasteners 300.

The rotary sensor subassembly 100 may sense the driving shaft 29. The rotary sensor subassembly 100 may be coupled to the housing 21. The rotary sensor subassembly 100 may sense movement of a rack and gear assembly 210 of the sensing guide 200, which will be described below, to sense movement of the driving shaft 29.

The rotary sensor subassembly 100 includes a rotary sensor 110, a sensor-gear interconnect 120, a coupling plate 130, and the sensor coupling parts 140.

The rotary sensor 110 may include a rotary sensor and sense the movement of the driving shaft 29. As an example, a resolver, a hall sensor, a torque and angle sensor (TAS), and the like may be used as the sensor provided to the rotary sensor 110. In addition, a known rotary sensor may be used as the rotary sensor provided to the rotary sensor 110, and the rotary sensor is not limited thereto.

When the driving shaft 29 which is a measurement target moves, the sensor-gear interconnect 120 may be coupled to or in contact with a gear 214 formed of a pinion gear which is engaged and rotated with the rack and gear assembly 210 of the sensing guide 200 which linearly moves with the driving shaft 29 to sense the movement of the driving shaft 29

The sensor-gear interconnect 120 may be coupled to a lower portion of the rotary sensor 110. The sensor-gear interconnect 120 may protrude downward from a sensing groove 111 positioned at the lower portion of the rotary sensor 110.

Here, "downward" is defined as a direction toward the housing 21 from the rotary sensor 110 on the basis of a direction in which the rotary sensor 110, the rack and gear assembly 210, the rack holder 220, and the housing 21 are sequentially positioned.

"Upward" is defined as a direction toward the rotary sensor 110 from the housing 21.

Figure 3:
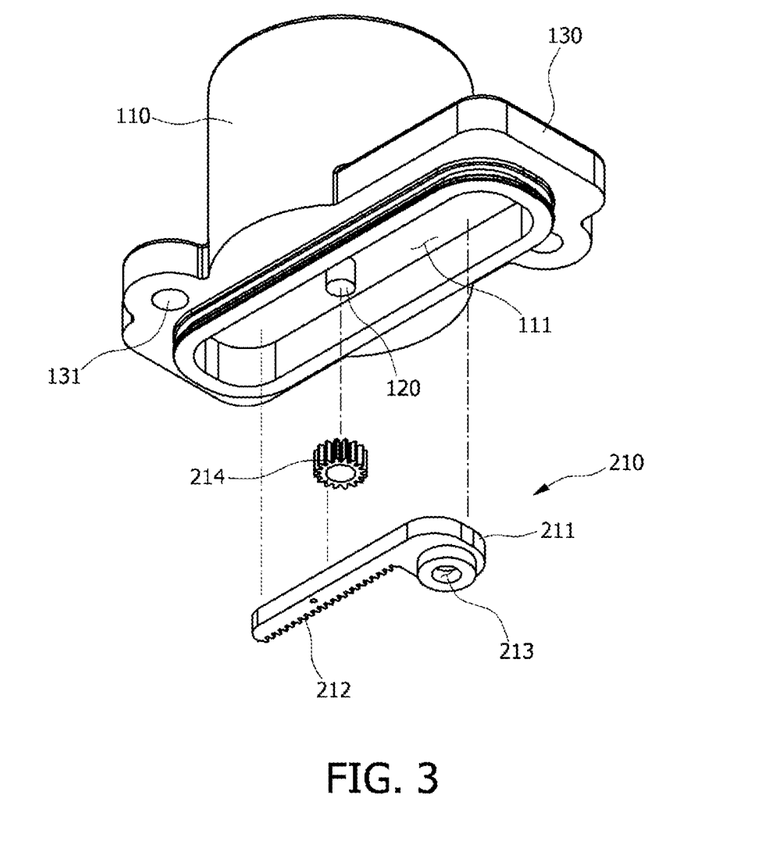
FIG. 3 is a plan view illustrating a rotary sensor subassembly of the rotary sensor assembly of FIG. 1 viewed from below.

The coupling plate 130 is formed by being coupled to or integrally formed with the rotary sensor 110 to allow the rotary sensor 110 to be coupled to the housing 21. As illustrated in FIG. 3, the coupling plate 130 is formed to have a shape to cover the guide groove 23 of the housing 21, and the sensing groove 111 is formed such that the sensor-gear interconnect 120 is disposed to protrude from the lower portion of the coupling plate 130. One or more sensor fasteners holes 131 may be formed in the coupling plate 130 so as to couple the coupling plate 130 to the sensor coupling parts 140.

The sensor coupling parts 140 are parts which couple the rotary sensor subassembly 100 to the housing 21. The sensor coupling parts 140 may be inserted into the sensor fasteners holes 131 formed in the coupling plate 130. The sensor coupling parts 140 may be inserted into the sensor fasteners holes 131 and the sensor coupling grooves 22 formed in the housing 21 to allow the rotary sensor subassembly 100 to be coupled to the housing 21. As an example, bolts may be provided as the sensor coupling parts 140.

Figure 4:
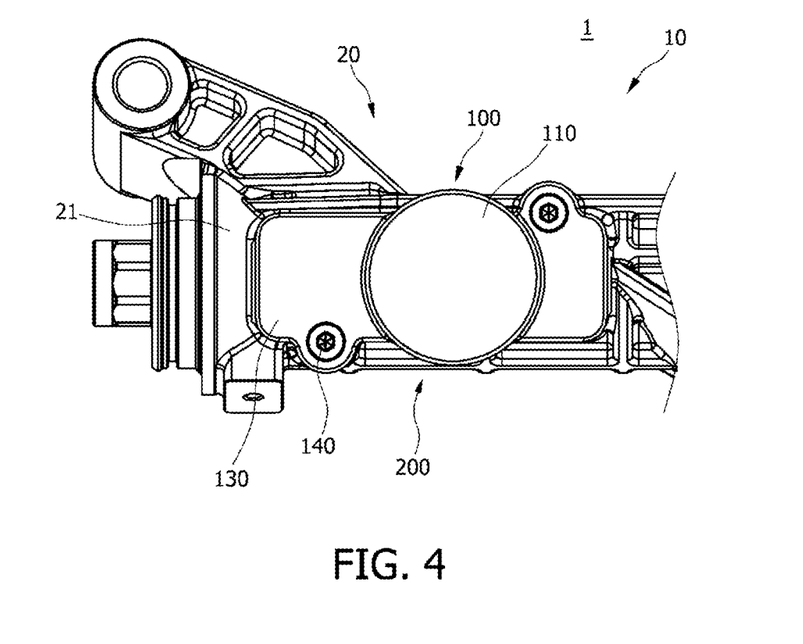
FIG. 4 is a plan view illustrating the rotary sensor assembly of FIG. 1 viewed from above.
Figure 5:
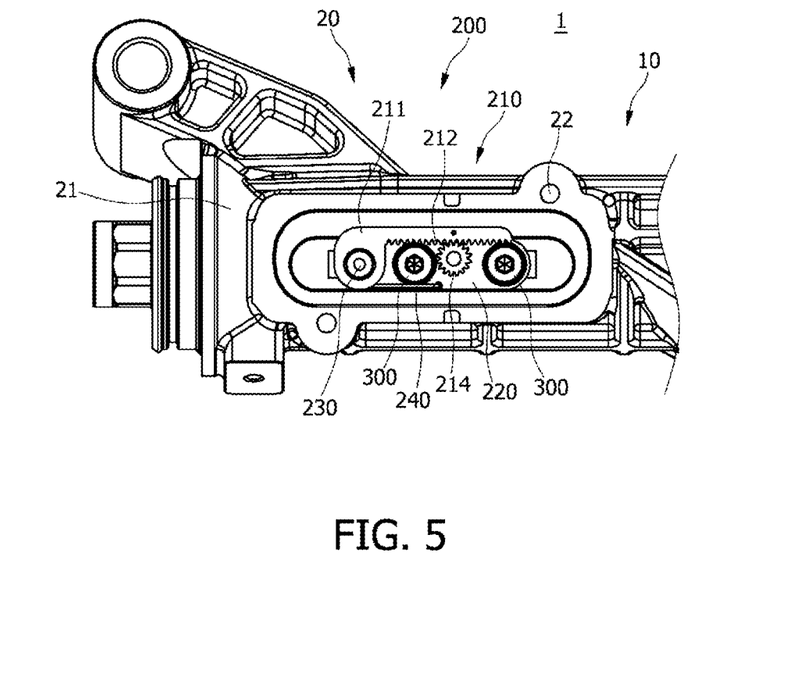
FIG. 5 is a plan view illustrating the rotary sensor assembly of FIG. 1 from which a cover part is removed, and which is viewed form above.
Figure 6:
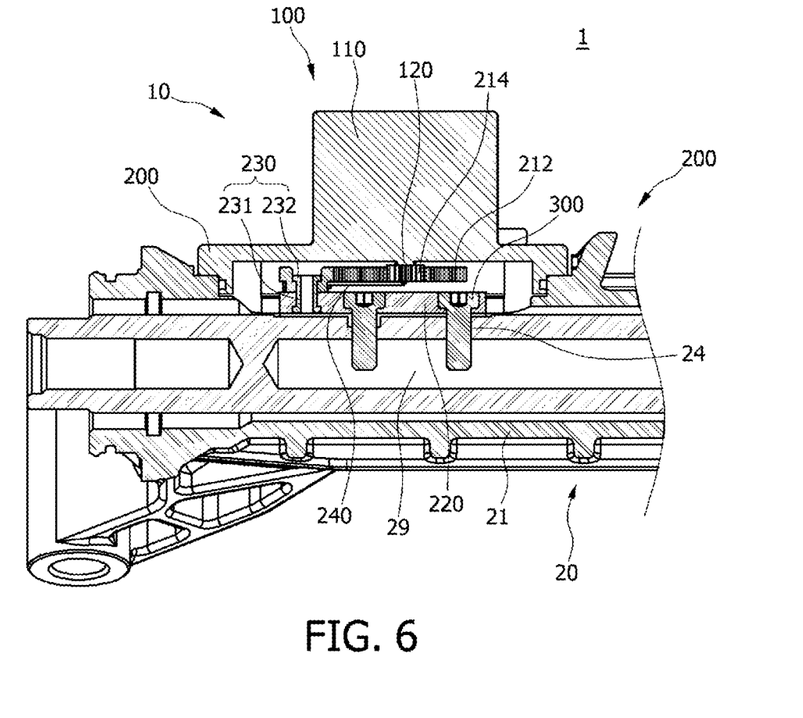
FIG. 6 is a cross-sectional view illustrating the rotary sensor assembly of FIG. 1.

The sensing guide 200 may allow the movement of the driving shaft 29 to be sensed by receiving the movement of the driving shaft 29 and moving. As seen through FIGS. 4 to 6, the sensing guide 200 may receive the movement of the driving shaft 29 and perform rack and pinion movement when the driving shaft 29 moves. That is, gear teeth 212 formed on a toothed rack 211 of the rack and gear assembly 210 are engaged and moved with the gear 214 according to linear movement of the driving shaft 29 so that the movement of the driving shaft 29 may be sensed.

The sensing guide 200 includes the rack and gear assembly 210, the rack holder 220, a toothed rack coupler 230, and an elastic part 240.

The rack and gear assembly 210 includes a toothed rack 211 and the gear 214. The toothed rack 211 linearly moves according to movement of the driving shaft 29 to rotate the gear 214 which is coupled to or in contact with the sensor-gear interconnect 120. Through this, the rack and gear assembly 210 allows the rotary sensor 110 to sense the movement of the driving shaft 29.

The toothed rack 211 may include a portion in which a toothed rack coupler hole 213 into which the toothed rack coupler 230 which couples the toothed rack 211 to the rack holder 220 is inserted and include the plurality of gear teeth 212 which are formed in a movement direction of the driving shaft 29, that is, a shaft direction of the driving shaft 29.

Specifically, the portion in which the toothed rack coupler hole 213 is formed may have a relatively large width and may be formed at one end portion of the toothed rack 211 in a longitudinal direction of the toothed rack 211, and the gear teeth 212 may be formed such that a part of the portion in which the toothed rack coupler hole 213 is formed has a relatively small width and may be formed to extend in the longitudinal direction of the toothed rack 211.

The gear 214 is a part engaged with the gear teeth 212 formed on the toothed rack 211. A pinion gear which is engaged and rotated with the gear teeth 212 may be provided as the gear 214, and the toothed rack 211 and the gear 214 may perform rack pinion movement when the driving shaft 29 moves.

Since the gear 214 is coupled to or in contact with the sensor-gear interconnect 120, the rotary sensor 110 may detect a stroke or the like of the driving shaft 29 due to rotation of the gear 214 through the sensor-gear interconnect 120 which is coupled to or in contact with the gear 214.

The rack holder 220 may be coupled to the rack and gear assembly 210. Since the rack holder 220 is coupled to and moved with the driving shaft 29, the rack holder 220 allows the rack and gear assembly 210 to linearly move with the driving shaft 29 when the driving shaft 29 moves. That is, the rack holder 220 couples the rack and gear assembly 210 and the driving shaft 29. The rack holder 220 is inserted into the guide groove 23 formed in the housing 21 and slides according to movement of the driving shaft 29.

The rack and gear assembly 210 may be positioned on the rack holder 220. The rack and gear assembly 210 and the rack holder 220 may be coupled by the toothed rack coupler 230, and a rack holder coupler hole 222 which communicates with the toothed rack coupler hole 213 may be formed in the rack holder 220 to be coupled to the toothed rack coupler 230.

Holder fasteners holes 221 may be formed in the rack holder 220 such that the fasteners 300, which will be described below, may be inserted into the fasteners holes 221. The plurality of holder fasteners holes 221 may be formed. The rack holder 220 is coupled to the driving shaft 29 by the fasteners 300, and through this, rotation of the driving shaft 29 is prevented.

The toothed rack coupler 230 may couple the rack and gear assembly 210 and the rack holder 220. A bush may be provided as the toothed rack coupler 230 and may be inserted into the toothed rack coupler hole 213 and the rack holder coupler hole 222.

The toothed rack coupler 230 may include a bush body 231 and bush protrusions 232.

The bush body 231 may have a cylindrical shape. The bush protrusions 232 may be formed on both end portions of the bush body 231. The bush protrusion 232 may have a ring shape. A diameter of the bush protrusion 232 may be greater than that of the bush body 231.

The bush protrusions 232 may be formed to couple two parts when the toothed rack coupler 230 is inserted into the toothed rack coupler hole 213 and the rack holder coupler hole 222.

The elastic part 240 may support the rack and gear assembly 210 and the rack holder 220. The elastic part 240 may provide a force which restricts the rack and gear assembly 210 and the rack holder 220 from moving laterally when the rack and gear assembly 210 and the rack holder 220 move linearly. That is, since the elastic part 240 is provided, the rack and gear assembly 210 and the rack holder 220 are prevented from moving laterally in a width direction of a linear movement direction, and the rack and gear assembly 210 and the rack holder 220 may stably and linearly move with the driving shaft 29. In addition, since the elastic part 240 is provided, separation, noise, vibration, and the like which may occur when the rack and gear assembly 210 and rack holder 220 laterally move may be prevented. As a specific example, a spring which is coupled to the toothed rack coupler 230 and presses the rack and gear assembly 210 and the rack holder 220 in left and right directions of the linear movement may be provided as the elastic part 240.

The fasteners 300 may couple the sensing guide 200 to the housing 21. As an example, the fasteners 300 may be inserted into the holder fasteners holes 221 formed in the rack holder 220 and the fasteners holes 24 of the driving shaft 29. Through this, the fasteners 300 couple the rack holder 220 coupled to the rack and gear assembly 210 to the driving shaft 29 and allow the rack and gear assembly 210 to move with the driving shaft 29. Since the fasteners 300 are coupled to the driving shaft 29, the rack and gear assembly 210 of the sensing guide 200 moves with the driving shaft 29 when the driving shaft 29 moves, and since the gear 214 engaged with the gear teeth 212 of the rack and gear assembly 210 rotates, rack and pinion movement occurs, and the sensor-gear interconnect 120 of the rotary sensor 110 performs sensing through the gear 214. In addition, since the fasteners 300 are coupled to the driving shaft 29, the rack holder 220, which slides along the guide groove 23, and the driving shaft 29 are integrated so that rotation of the driving shaft 29 is prevented.

As an example, the plurality of fasteners 300 may be provided. The number of the fasteners 300 corresponding to the number of the holder fasteners holes 221 of the rack holder 220 and the number of the fasteners holes 24 of the driving shaft 29 may be provided. As a specific example, bolts may be provided as the fasteners 300.

As described above, since a rotary sensor assembly according to one embodiment of the present invention is provided, rotation of a driving shaft can be prevented.

In addition, since the rotary sensor assembly according to one embodiment of the present invention is provided, a stroke of the driving shaft can be sensed.

In addition, when the stroke of the driving shaft is measured, since the sensing guide can measure the stroke according to one embodiment of the present invention, sensing efficiency can be improved.

In addition, there is an advantage in that a specification of a sensor is applied without change, and gear teeth of a rack and gear assembly and a size of a pinion can be adjusted even when the stroke of the driving shaft increases according to one embodiment of the present invention.

In addition, since an elastic part is provided to a sensing guide according to one embodiment of the present invention, the sensing guide is prevented from moving laterally in a moving direction, and thus separation, noise, vibration, and the like which may occur during sensing can be prevented.

In addition, since there is only a pressure of the elastic part which is applied to the rotary sensor assembly according to one embodiment of the present invention when the rotary sensor assembly is driven, durability can be improved.

Effects of the present invention are not limited to the above-described effects, and other effects which are not described above will be clearly understood by those skilled in the art through the present specification and the accompanying drawings.

The above-described detailed description illustrates the present invention. In addition, the above description describes exemplary embodiments of the present invention, and the present invention may be used through various other combinations, modifications, and environments. That is, the present invention may be changed or modified within a range of the concept of the invention disclosed in this specification, a range equivalent to the disclosed contents and/or a range of a technology or knowledge of the art. The above-described embodiments describe exemplary embodiments to realize the technical spirit of the present invention, and various modifications required in specific application fields and uses of the present invention may also be implemented. Therefore, the above-described detailed description of the present invention is not intended to limit the present invention in the disclosed embodiments. In addition, it should be interpreted that the range of the appended claims also includes other embodiments.

What is claimed is:

1. A rotary sensor assembly comprising:
    a rotary sensor subassembly configured to sense a stroke of a driving shaft configured to be linearly movable in response to input of rotating power;
    a sensing guide configured to be movable by a force generated by the driving shaft such that the rotary sensor subassembly senses movement of the driving shaft; and
    fasteners coupling the sensing guide to the driving shaft,
    wherein the rotary sensor subassembly is configured to sense movement of the sensing guide to sense the stroke of the driving shaft, and
    wherein the sensing guide includes a rack and gear assembly having a toothed rack configured to move according to the movement of the driving shaft and a gear; a rack holder coupled to the rack and gear assembly to support the rack and gear assembly; and a toothed rack coupler coupling the toothed rack and the rack holder.

2. The rotary sensor assembly of claim 1, wherein the rotary sensor subassembly includes:
    a rotary sensor configured to sense the driving shaft; and
    a sensor-gear interconnect having one end which is in contact with the gear and configured to transmit movement of the gear to the rotary sensor,
    wherein the rotary sensor senses the movement of the gear when the driving shaft moves whereby the rotary sensor senses the stroke of the driving shaft.

3. The rotary sensor assembly of claim 2, wherein:
    the sensor-gear interconnect is located under the rotary sensor; and
    the sensor-gear interconnect protrudes toward the rack and gear assembly.

4. The rotary sensor assembly of claim 3, wherein a pinion gear engaged and rotated with the toothed rack is provided as the gear.

5. The rotary sensor assembly of claim 4, wherein the sensor-gear interconnect is coupled to or in contact with the gear to allow the rotary sensor to detect the stroke of the driving shaft.

6. The rotary sensor assembly of claim 1, wherein the gear is configured to be moved by engaging with gear teeth formed on at least a part of the toothed rack.

7. The rotary sensor assembly of claim 1, wherein:
    a toothed rack coupler hole into which the toothed rack coupler is inserted is located in the toothed rack; and
    a rack holder coupler hole into which the toothed rack coupler is inserted is formed in the rack holder.

8. The rotary sensor assembly of claim 1, wherein the toothed rack coupler includes:
    a bush body; and
    bush protrusions formed at both ends of the bush body, having diameters which are greater than that of the bush body, and provided to have ring shapes.

9. The rotary sensor assembly of claim 1, wherein a plurality of fastener holes to which the fasteners are coupled are formed in the rack holder.

10. The rotary sensor assembly of claim 1, wherein the sensing guide further includes an elastic part which presses the rack and gear assembly and the rack holder when the rack and gear assembly and the rack holder move with the driving shaft.

11. A rear wheel steering system comprising:
    the rotary sensor assembly of claim 1; and
    a driving shaft assembly including the driving shaft connected to a rear wheel, driven by power received from a motor, and configured to change a tow angle of the rear wheel, and a housing inside which the driving shaft is positioned.

12. A rotary sensor assembly comprising:
- a rotary sensor subassembly configured to sense a stroke of a driving shaft configured to be linearly movable in response to input of rotating power;
- a sensing guide configured to be movable by a force generated by the driving shaft such that the rotary sensor subassembly senses movement of the driving shaft; and
- fasteners coupling the sensing guide to the driving shaft,
- wherein the rotary sensor subassembly is configured to sense movement of the sensing guide to sense the stroke of the driving shaft,
- wherein the sensing guide includes a rack and gear assembly having a toothed rack configured to be movable in response to the movement of the driving shaft and a gear, and a rack holder configured to support the rack and gear assembly, and
- wherein a plurality of fastener holes to which the fasteners are coupled are formed in the rack holder.

13. The rotary sensor assembly of claim 12, wherein the rack holder is coupled to the rack and gear assembly.

14. The rotary sensor assembly of claim 12, wherein the rotary sensor subassembly includes:
- a rotary sensor configured to sense the driving shaft; and
- a sensor-gear interconnect having one end which is in contact with the gear and configured to transmit movement of the gear to the rotary sensor,
- wherein the rotary sensor senses the movement of the gear when the driving shaft moves whereby the rotary sensor senses the stroke of the driving shaft.

15. The rotary sensor assembly of claim 12, wherein the gear is configured to be movable by engaging with gear teeth formed on at least a part of the toothed rack.

16. The rotary sensor assembly of claim 12, wherein the sensing guide further includes a toothed rack coupler which couples the toothed rack and the rack holder.

17. A rear wheel steering system comprising:
- the rotary sensor assembly of claim 12; and
- a driving shaft assembly including the driving shaft connected to a rear wheel, driven by power received from a motor, and configured to change a tow angle of the rear wheel, and a housing inside which the driving shaft is positioned.

* * * * *